(12) United States Patent
Sakai

(10) Patent No.: US 6,952,311 B2
(45) Date of Patent: Oct. 4, 2005

(54) MICROLENS DEVICE AND METHOD OF MANUFACTURING THE SAME, ELECTRO-OPTIC DEVICE AND ELECTRONIC APPARATUS

(75) Inventor: Hirofumi Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/847,444

(22) Filed: May 18, 2004

(65) Prior Publication Data
US 2005/0007669 A1 Jan. 13, 2005

(30) Foreign Application Priority Data
Jun. 4, 2003 (JP) ........................................ 2003-159669

(51) Int. Cl.[7] ............................................. G02B 27/10
(52) U.S. Cl. ...................... 359/619; 359/626; 349/95; 349/112; 347/106
(58) Field of Search ................................ 359/619–628; 349/95, 106, 110, 112; 347/106, 241, 244; 430/7

(56) References Cited

U.S. PATENT DOCUMENTS

| 5,074,649 A | * | 12/1991 | Hamanaka ................... 359/652 |
| 6,535,338 B2 | * | 3/2003 | Nishikawa ................... 359/619 |
| 6,618,201 B2 | * | 9/2003 | Nishikawa et al. ......... 359/619 |
| 2002/0145807 A1 | * | 10/2002 | Nishikawa ................... 359/619 |

FOREIGN PATENT DOCUMENTS

| JP | 11-142608 | 5/1999 |
| JP | 2000-035504 | 2/2000 |

* cited by examiner

Primary Examiner—Huy Mai
(74) Attorney, Agent, or Firm—Oliff & Berridge, PLC (57) ABSTRACT

To reduce light passing through the gap between lenses. A plurality of lens sections L are provided on a substrate P with a gap therebetween by ejecting droplets. A control material is applied to the gap between the lens sections, the control material controlling rectilinear propagation of the light.

13 Claims, 8 Drawing Sheets

MICROLENS DEVICE AND METHOD OF MANUFACTURING THE SAME, ELECTRO-OPTIC DEVICE AND ELECTRONIC APPARATUS

BACKGROUND OF THE INVENTION

1. Field of Invention

The present invention relates to a microlens device and its manufacturing method, an electro-optic device, and an electronic apparatus.

2. Description of Related Art

In recent years, as expansion of multimedia, applications of a lens array (a microlens device) formed of a number of microlenses has been increased.

Such a related art microlens device is used for a various applications, such as, for example, a device disposed between a light source and a liquid crystal panel in a liquid crystal projector to prevent a loss of light intensity, a device provided on a surface of a screen to make displayed images brighter, a device disposed on a solid-state image sensing device to increase incident light intensity, or a device used for an optical communication element for a glass fiber.

As a method of manufacturing such kind of microlens device, there are proposed a method of shaping a glass material by using a metal mold, a method of shaping resin by pinching the resin between a stamper and a base plate, and application of the photolithography method. However, since all of these methods require mold tools or masks to form lenses, it is difficult to form lenses of given shapes and given arrangement at once.

To cope with the above, a Japanese laid-open patent publication No. 1999–142608 discloses a technology in which a droplet is ejected (so called inkjet method) onto a surface of a transparent substrate and then cured to form a convex microlens.

By using this technology, complicated patterns can be easily formed without any masks or mold tools necessary for the photolithography method, printing methods, or molding methods.

However, there is a problem as explained below in common to the related art as described above.

SUMMARY OF THE INVENTION

For example, in a structure in which a plurality of microlenses is disposed on a flat transparent substrate to form an array, light goes straight without being scattered by gaps between the microlenses.

In view of an application using optical elements like the above microlens array, it is desirable for enhancement of the contrast that light, projected from behind the optical element, is scattered by passing through the optical-element to have little view angle dependency. The concern arises that the contrast drops due to the light passing straight through the gap between the lenses.

The present invention has been made taking the above into consideration and has an advantage of providing a microlens device and its manufacturing method, an electro-optic device, and an electronic apparatus capable of contributing to enhancement of the contrast by reducing the likelihood or preventing the light from passing straight through the gap between the lenses.

A method of manufacturing a microlens device according to the an aspect of the present invention includes ejecting a droplet to form a plurality of lens sections on a substrate with a predetermined gap therebetween and applying a control material in the gap between the plurality of lens sections, the control material controlling rectilinear propagation of light.

Accordingly, the microlens device thus manufactured by the method according to an aspect of the present invention provides a broader view angle by controlling at least a part of light not to be propagated straight in the gap between the lens sections.

As a method of controlling rectilinear propagation of light, a method of the control material absorbing at least a part of the light, a method of the control material reflecting the incident light, a method of the control material scattering the incident light, and so on, can be adopted. In case of scattering the light, the control material can be shaped to have a curved surface in the gap.

In the above structures, light can be prevented from going straight, thus reducing the view angle dependency to contribute to increased contrast.

Furthermore, as a method of applying the control material to the gap between the lens sections, to easily form a complicated pattern, a droplet may be ejected containing the control material to apply to the gap as in the case of forming the lens sections.

Further, an aspect of the present invention may include curing the lens sections formed on the substrate and providing lyophilicity to a region corresponding to the gap before applying the control material.

According to this, in an aspect of the present invention, the lens sections formed of ejected droplets can be cured with lens shapes defined by a contact angle with the substrate and the surface tension of the droplets. Then the gaps between the lens sections can be filled with the applied control material by extending over the wettable gaps. In this case, since the lens sections have been cured, any adverse effects to the shapes or characteristics of the lens sections from the applied control material is avoided.

In this case, lyophobicity may be provided to the cured lens sections while keeping lyophilicity of the region corresponding to the gap.

According to this, if the control material is applied to the lens sections, the control material can be repelled to be moved to the regions corresponding to the gaps between the lens sections having lyophilicity.

If the lens sections and the control material applied between the lens sections are formed in a plurality of layers, the lens sections in one layer may be shifted from the lens sections in the other layer.

Even if a region through which light can pass straight exists in a section (a control section) formed with the control material in the gap between the lens sections, the region through which light can pass straight can be shifted by shifting the lens sections by each layer.

Accordingly, if light can pass straight through the gap between the lens sections of the first layer, it can be less possible for the light to pass straight through the gap between the lens sections of the second layer.

Furthermore, a microlens device according to an aspect of the present invention is characterized by being manufactured by the manufacturing method as described above.

Accordingly, in an aspect of the present invention, a microlens device that enhances the contrast in a broader view angle by reducing or blocking the light passing straight through the gap between the lens sections is provided.

An electro-optic device according to an aspect of the present invention is equipped with the microlens device described above.

Also, an electronic apparatus according to an aspect of the present invention is equipped with the electro-optic device described above.

Accordingly, an electro-optic device and an electronic apparatus having the enhanced contrast in a broader view angle is provided.

If the electro-optic device is equipped with an organic EL light emitting element including a light emitting layer between a pair of electrodes, the microlens device may be disposed above one of the electrodes disposed on a light emission side of the light emitting layer.

By this structure, inconvenience, such as oxidization of the electrodes caused by contacting of the electrodes with the lens sections or the control material, can be avoided.

DETAILED DESCRIPTION OF EXEMPLARY EMBODIMENTS

Hereinafter, a microlens device and its manufacturing method, an electro-optic device and an electronic apparatus as exemplary embodiments of the present invention are described with referring to FIGS. 1 through 10.

First Exemplary Embodiment

The present exemplary embodiment is described using an example in which translucent resin is ejected as a droplet from a nozzle of a droplet ejection head by a droplet ejection method and is applied to a translucent substrate to form a lens section and then light blocking (lightproof) ink is ejected as a droplet to apply to the gap between the lens sections.

If the microlens to be manufactured is applied as, for example, an optical membrane for a screen, a translucent sheet or a translucent film is used as a substrate, the translucent sheet or the translucent film including cellulosic resin, such as acetylcellulose or propyl cellulose, or transparent resin (translucent resin), such as polyvinylchloride, polyethylene, polypropylene, or polyester. Furthermore, if the microlens is applied as a microlens array, a substrate made of a transparent material (a translucent material), such as glass, polycarbonate, polyarylate, polyethersulfone, amorphous polyolefin, polyethylene terephthalate, or polymethylmethacrylate can be used.

Thermoplastic or thermoset resin, such as acrylic resin, allyl resin, methacrylic resin, polyurethane resin, polyester resin, polyvinylchloride resin, polyvinyl acetate resin, cellulosic resin, polyamide resin, fluorinated resin, polypropylene resin, or polystyrene resin can be cited as light transmissive resin that can be a material of the lenses. Polymethylmethacrylate, polyhydroxyethylmethacrylate, and polycyclohexylmethacrylate are examples of the acrylic resin. Polydiethyleneglycol bisaryl carbonate, and polycarbonate are examples of the allyl resin. One of the above resins or a combination of some of them can be used as the material of the lenses.

The light transmissive resin can be used as irradiation-curing type of resin by compounding a photo polymerization initiator, such as a biimidazole compound. Specifically, by compounding such a photo polymerization initiator, the irradiation-curing property can be applied to the light transmissive resin. Note that "irradiation" includes irradiation of visible light, ultraviolet ray, fur ultraviolet ray, X-ray, and electron ray. Among the above, ultraviolet ray is commonly used for this purpose.

Furthermore, as examples of an ejection technology for the droplet ejection method, a charge control method, a pressure vibration method, an electromechanical transforming method, an electro-thermal transforming method, and an electrostatic absorption method can be cited. In the charge control method, a material is charged by a charging electrode and ejected from a nozzle with its flying direction being controlled by a deflection electrode. In the pressure vibration method, very high pressure of about 30 kg/cm$^2$ is applied to a material to eject the material from the tip of a nozzle. The material goes straight to be ejected from the nozzle if no control voltage is applied. If the control voltage is applied, the material is not ejected from the nozzle because the material is scattered by an electrostatic repelling force. In the electromechanical transforming method that utilizes characteristics of the piezoelectric elements that deform in response to pulsed electric signals, pressure caused by deformation of the piezoelectric element is applied via a flexible material to a chamber containing a material to cause the material to be put out of the chamber to be ejected from a nozzle.

In the electro-thermal transforming method, a material is suddenly evaporated into bubbles by a heater disposed in a space containing the material, the bubbles causing pressure to eject the material in the space. In the electrostatic absorption method, meniscus of a material is formed in a nozzle by applying weak pressure in a space containing the material. Then the material is pulled out after applying an electrostatic attraction force. Furthermore, other technologies than the above, such as a method of utilizing changes in viscosity of fluid caused by an electric field, or a method of ejecting by a spark discharge can also be applied. The droplet ejection method has advantages of no waste in using materials and of disposing a required amount of materials to a required position with precision. Note that an amount of the droplet of a fluid material (fluid) ejected by the droplet ejection method differs in accordance with the head and the fluid material, but is typically about 1 through 20 pl.

The number of droplets to be ejected is predetermined as, for example, 3 or 5 pieces in accordance with the size of the microlens to be formed and so on.

Hereinafter, a device manufacturing system used for a microlens array as a microlens device according to an aspect of the present invention.

As the device manufacturing system, a droplet ejection machine that manufactures a device by ejecting droplets from a droplet ejection head to the substrate.

Figure 1:
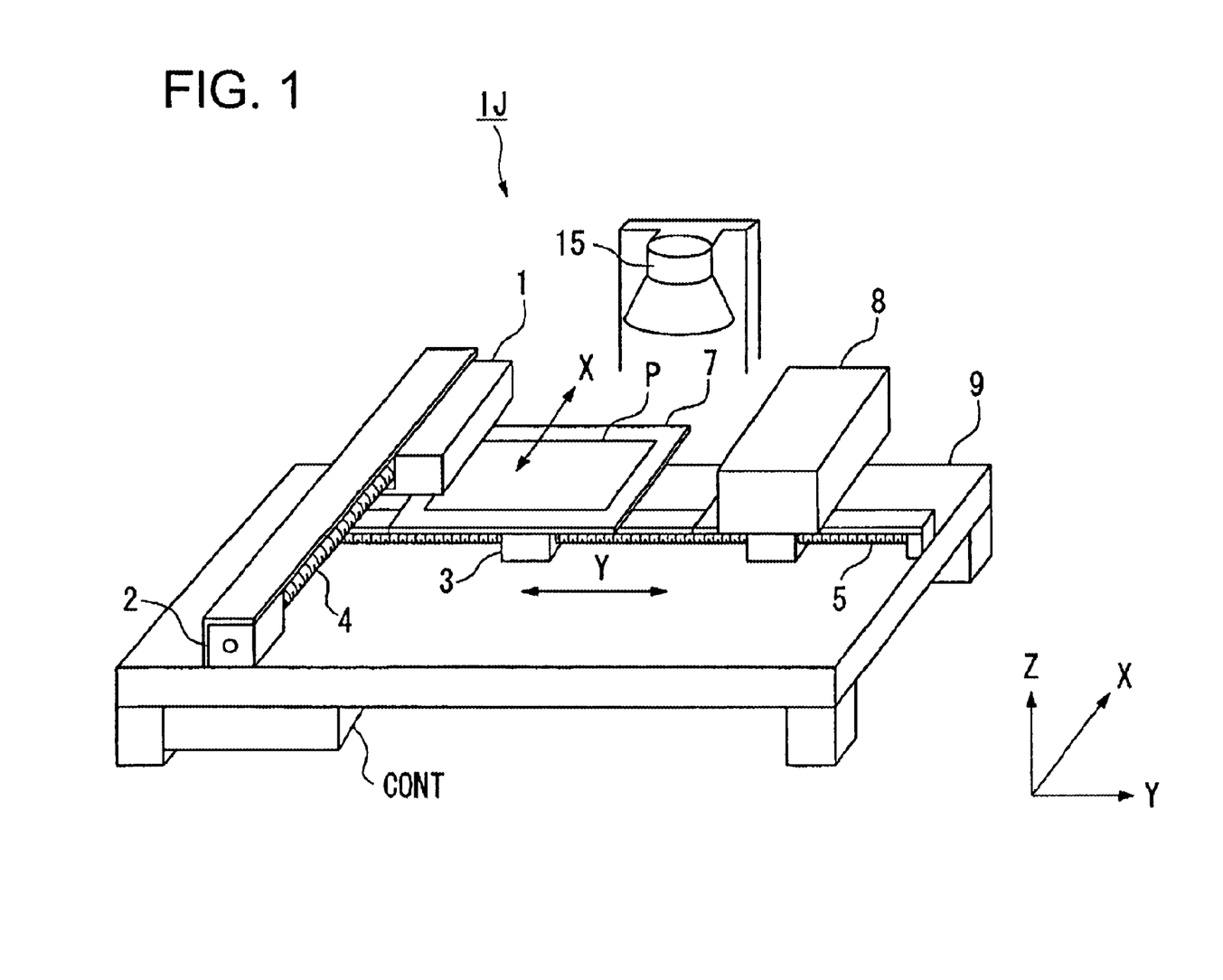
FIG. 1 is a schematic of the droplet ejection device.

FIG. 1 is a schematic showing a configuration of the droplet ejection machine IJ.

The droplet ejection machine IJ is equipped with a droplet ejection head 1, an X-axis direction drive shaft 4, a Y-axis direction guide shaft 5, a controller CONT, a stage 7, a cleaning mechanism 8, a base 9, and a heater 15.

The stage 7 is to support a substrate P to which the ink (function fluid) is applied by this droplet ejection machine IJ, and equipped with a fixing mechanism not shown to fix the substrate to a reference position.

The droplet ejection head 1 is a multi-nozzle type of droplet ejection head that is equipped with a plurality of ejection nozzles. The longitudinal direction of the nozzles matches the Y-axis. The plurality of ejection nozzles is disposed on the under surface of the droplet ejection head 1 so as to line up in the Y-axis direction with a constant interval. The ink containing, the translucent resin mentioned above is ejected from the ejection nozzles of the droplet ejection head 1 to the substrate P supported by the stage 7.

An X-axis direction drive motor 2 is connected to the X-axis direction drive shaft 4. A stepping motor or the like is used as the X-axis direction drive motor 2 that rotates the X-axis direction drive shaft 4 when an X-direction drive signal is supplied from the controller CONT. When the X-axis direction drive shaft 4 rotates, the droplet ejection head 1 moves in the X-axis direction.

The Y-axis direction guide shaft 5 is fixed to the base 9 so as not to move relatively. The stage 7 is equipped with a Y-axis direction drive motor 3. A stepping motor or the like is used as the Y-axis direction drive motor 3 that moves the stage 7 in the Y-axis direction when a Y-direction drive signal is supplied from the controller CONT.

The controller CONT energizes the droplet ejection head 1 to control ejection of the droplets. Also, it supplies to the X-axis direction drive motor 2 with a drive pulse signal to control movement in the X-axis direction of the droplet ejection head 1, and to the Y-axis direction drive motor 3 with a drive pulse signal to control movement in the Y-axis direction of the stage 7.

The cleaning mechanism 8 is to clean the droplet ejection head 1, and is equipped with a drive motor to drive in the Y-axis direction not shown in the drawings. The cleaning mechanism is moved along the Y-axis direction guide shaft 5 by the drive motor for driving in the Y-axis direction. The controller CONT also controls the movement of the cleaning mechanism.

The heater 15 heat-treats the substrate P by ramp annealing to dry the translucent resin applied to the substrate P. The controller CONT also controls powering-on and powering-off of the heater 15.

The droplet ejection machine IJ ejects droplets while the droplet ejection head 1 relatively scans the stage 7 for supporting the substrate P. The X-axis direction is hereinafter referred to as scanning direction, and the Y-axis direction as non-scanning direction. Accordingly, the ejection nozzles of the droplet ejection head 1 are lined up with the constant interval in the Y-axis direction, specifically the non-scanning direction. Although the droplet ejection head is disposed perpendicular to the movement direction of the substrate P in FIG. 1, it is possible to adjust the angle of the droplet ejection head 1 within a range in which the droplet ejection head 1 traverses the movement direction of the substrate P. By being thus arranged, the effective pitch of the nozzles can be adjusted by adjusting the relative angle of the droplet ejection head 1. Further, the distance between the substrate P and the nozzle surface can be arranged to be adjusted as requirements.

Figure 2:
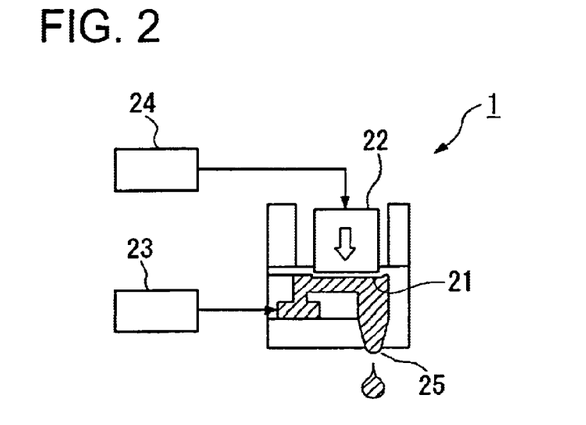
FIG. 2 is a schematic for explaining the principle of ejecting a material in the piezoelectric method.

FIG. 2 is a schematic view for explaining the principle of ejecting a material in the piezoelectric method. In FIG. 2, a piezoelectric element 22 is disposed adjacent to a fluid chamber 21 that contains the fluid material ink for the lenses, or translucent resin. The fluid material is supplied to the fluid chamber 21 via a fluid material supplying system 23 including a material tank that contains the fluid material. The piezoelectric element 22 is connected to a drive circuit 24.

When the piezoelectric element 22 is energized through the drive circuit 24, the piezoelectric element 22 deforms to deform the fluid chamber 21 resulting in ejection of the fluid material from the nozzle 25. In this case, the amount of distortion of the piezoelectric element 22 can be controlled by changing the amount of voltage applied thereto. Further, by changing the frequency of the applied voltage, the distortion speed can be controlled. Since no heat is applied to the material in ejection of the droplets using the piezoelectric method, the advantage of little effect on the composition of the material.

A manufacturing method of a microlens array according to an aspect of the present invention is hereinafter described referring to FIG. 3.

First, a surface of a inorganic transparent substrate P is treated to have lyophobicity to the fluid material. Specifically, the surface of the substrate P is treated so that the contact angle with the translucent resin becomes 40 degree or more.

As a method of controlling the lyophobicity (wettability) of the surface, for example, a method of forming a self-assembled film on the surface of the substrate or the plasma polymerization method can be adopted.

In the self-assembled film forming method, the self-assembled film including an organic molecular film and so on is formed on a surface of a substrate on which a microlens is to be formed.

The organic molecular film to treat the surface of the substrate is equipped with a functional group that can bond with the substrate, a functional group that modifies the properties of the surface (controls the surface energy), such as a lyophilic group or a lyophobic group disposed opposite to this functional group and a normal chain of carbon or a partially branched carbon chain that connects these functional groups, and bonds with the substrate and self-assembles to form a molecular film, such as a monomolecular film.

Note that the self-assembling film includes a combinative functional group and a normal chain molecule other than the combinative functional group that can react with atoms constituting the foundation layer of the substrate. The self-assembling film is formed by orientating a compound having an extremely high orientation due to an interaction of the normal chain molecules. Since the self-assembling film is formed by orientating single molecules, the film can be extremely thin and can be made uniform on the molecule revel. Since the same molecules are disposed on the surface of the film, it is possible to apply to the surface of the film with the uniform and excellent lyophilicity or lyophobicity.

By using, for example, fluoroalkylsilane as the compound having high orientation as mentioned above, each compound is orientated so that the fluoroalkyl group is positioned on the surface of the film to form the self-assembled film and the uniform lyophobicity is applied to the surface of the film.

As the chemical compounds to form the self-assembling film, fluoroalkylsilane (hereinafter referred to as "FAS"), such as:

heptadecafluoro-1,1,2,2 tetrahydrodecyltriethoxysilane;
heptadecafluoro-1,1,2,2 tetrahydrodecyltrimethoxysilane;
heptadecafluoro-1,1,2,2 tetrahydrodecyltrichlorosilane;
tridecafluoro-1,1,2,2 tetrahydrooctyltriethoxysilane;
tridecafluoro-1,1,2,2 tetrahydrooctyltrimethoxysilane;
tridecafluoro-1,1,2,2 tetrahydrooctyltrichlorosilane; or
trifluoropropyltrimethoxysilane can be exemplified.
These compounds can be used alone or in combination.
Note that by using FAS, adhesiveness with the substrate as well as good lyophobicity can be obtained.

FAS can commonly be expressed by the following structural formula.

In the formula, n denotes an integer number on and between 1 and 3, X denotes a hydrolytic group, such as a methoxy group, an ethoxy group, or a halogen atom. And R denotes a fluoroalkyl group having the following structure.

wherein x denotes an integer number on and between 0 and 10, y denotes an integer number on and between 0 and 4. If a plurality of R or X is bonded with Si, the R or the X can be the same or different from each other. The hydrolytic group denoted by X forms silanol, when hydrolyzed, that reacts with a hydroxyl group of the foundation layer of the substrate (glass, silicon), and is bonded with the substrate by the siloxane bond. Furthermore, R having a fluoro group, such as (CF2) on the surface can modify the surface of the foundation layer of the substrate to be a non-wetting (with a low surface energy) surface.

The self-assembled film including the organic molecular film is formed on the substrate by sealing the material compound and the substrate in a airtight container and keeping it at room temperature for two or three days. If the container is held at 100 degrees centigrade, it takes about three hours for the film to be formed. In these methods, the film is formed from the vapor phase. The film can also be formed from the liquid phase. For example, the self-assembled film can also formed on the substrate by dipping the substrate into a solution containing the material compound, and then washing and drying the substrate.

Before forming the self-assembled film, pre-treatment may be performed, such as exposing the surface of the substrate to ultraviolet light, or washing it with solvent.

In the plasma polymerization method, the substrate is exposed to plasma at normal pressure or in vacuo. A kind of gas used for the plasma polymerization can be selected from various kinds, taking the material of the surface of the substrate P on which the microlens is to be formed into consideration. As the gas for the polymerization, tetrafluoromethane, perfluorohexane, and perfluorodecane can be exemplified.

The process of applying lyophobicity to the surface of the substrate P may be a process of attaching to the surface of the substrate a film having appropriate lyophobicity. For example, a polyimide film treated with tetrafluoroethylene. Or, polyimide film with high lyophobicity can be used as the substrate without any additional treatments.

Figure 3A:
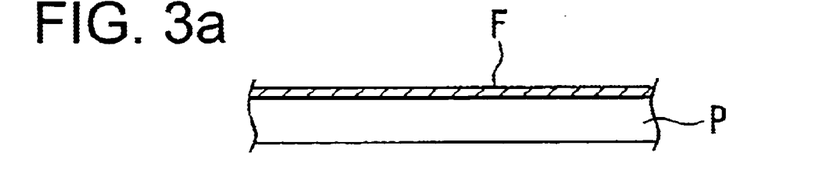
FIGS. 3a–3d are schematics showing a sequence of a manufacturing method of the microlens array.

As described above, by executing the self-assembled film forming method or the plasma polymerization method, a lyophobic film F is formed on the surface of the substrate P as shown in FIG. 3a.

Figure 3B:
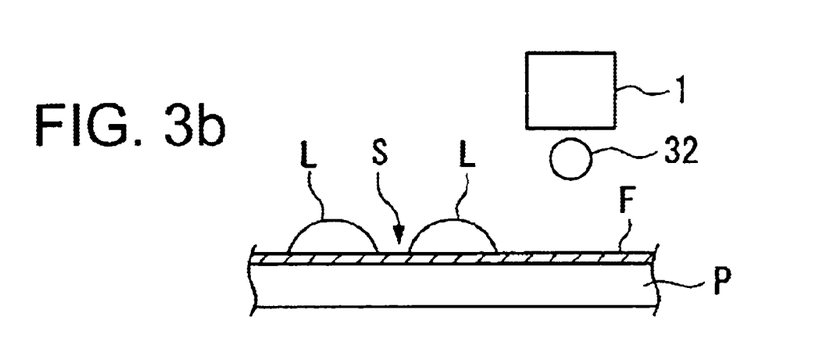

Then the translucent resin is applied on a lens forming region of the substrate P using the droplet ejection method by the droplet ejection machine IJ described above. As an example, a UV-curing type of translucent resin (hereinafter referred to as a UV-curing resin) is ejected and then applied.

Specifically, in this process, as shown in FIG. 3b, ink containing the UV-curing resin is ejected as a droplet 32 while the droplet ejection head 1 of the droplet ejection machine IJ mentioned above is moved relatively to the substrate P. The lens section L is formed by disposing the droplet 32 on the predetermined lens forming region of the substrate P. In further detail, a plurality of lens sections (microlenses) L is formed with gaps S formed between the lens sections by ejecting a plurality of the droplets 32 in a predetermined pitch while the droplet ejection head is moved relatively to the substrate P.

In this case, since the surface of the substrate P is treated to be lyophobic, the droplet of the UV-curing resin that has landed thereon is formed of a substantially semispheric lens due to the contact angle with the substrate P and the surface tension of the ink.

Figure 3C:
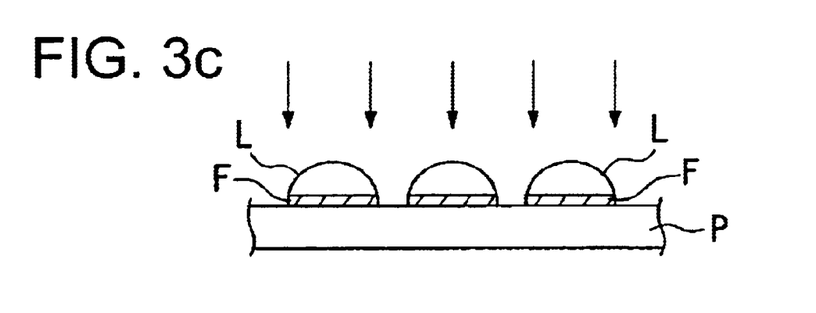

Then the UV light (ultraviolet light) is irradiated to cure the UV-curing resin.

Specifically, the UV-curing resin is cured with maintaining the shape of the lens when the substrate P on which the lens section is formed is exposed to the ultraviolet light having wavelength of, for example, 170 through 400 nm. Furthermore, a portion of the lyophobic film F corresponding to the gap S between the lens sections L is exposed to the UV light, as shown in FIG. 3c, and is decomposed (to have less lyophobicity) by the UV light resulting in the inorganic glass surface of lyophilicity except the lens forming regions. Note that a decomposing level of the lyophobic film can be controlled by the exposure time to the ultraviolet light, strength or wavelength of the ultraviolet light, or combination with a thermal treatment and so forth.

In the above process to apply lyophilicity, the condition of the exposure to the UV light is selected so that the difference in the contact angles with the UV-curing resin in the lyophobic section and the lyophilic section is within the range of 20 through 180 degrees.

Then a process to apply lyophobicity to the lens section L on the substrate P is consequently executed to apply lyophobicity to the surface thereof.

As a process to apply lyophobicity, a fluorocarbon plasma treatment, for example, can be cited. This fluorocarbon plasma treatment makes fluorine ions stick to the surface of the lens section L that is an organic matter, which applies lyophobicity to the surface of the lens section L.

Since the inorganic surface of the substrate P hardly bonds with fluorine, lyophilicity is maintained in the gap S.

Figure 3D:
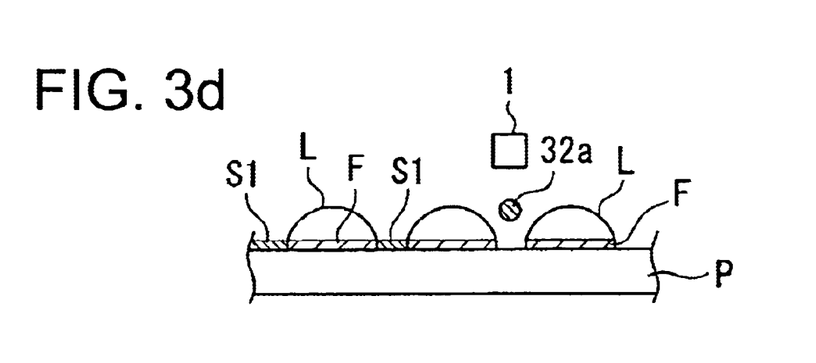

Then, as is the case with the UV-curing resin, a light-blocking section S1, that blocks light to control rectilinear propagation of light, is formed by ejecting the ink (the control material) containing light-blocking solid contents from the droplet ejection head 1 as a droplet 32a and then disposing the droplet 32a on the gap S between the lens sections L while moving the droplet ejection head 1 of the droplet ejection machine IJ relative to the substrate P. As the ink, the material for controlling rectilinear propagation of light, a mixture of R (red), G (green), and B (blue) materials used for color filters (e.g., a composition made of thermosetting acrylic resin, an organic pigment, diethylene glycol butyl ether derivatives and so on), ink containing a metal such as chrome, or ink containing a silver (Ag) paste can be applicable. With these materials, the incident light can be blocked (prevented from passing through) by being absorbed or reflected.

When droplets of the light-blocking ink are ejected, any of the droplets applied on the lens sections L are repelled by the lens sections L that is applied with lyophobicity, and then pooled on the gap S between the lens sections L. Furthermore, since the surface of the substrate corresponding to the gap S is applied with lyophilicity, the ejected ink can easily be spread on the gap S, thus enabling the fluid to fill up the gap S with uniformity in the predetermined position without segmentized.

Then, by drying (baking) the substrate P, a black matrix that is a light-blocking film is formed on the gap S.

As described above, in the present exemplary embodiment, since the light-blocking ink is applied to the gap S between the lens sections L, it is avoided that light goes straight through the gap S to be projected therefrom, thus reducing the view angle dependency and contributing to enhancement of the contrast.

Furthermore, in the present exemplary embodiment, since the surface of the substrate corresponding to the gap S is applied with lyophilicity, it is possible to smoothly spread the ejected light-blocking ink in the wettable gap S to uniformly fill the gap S with the ink. Especially, in the present exemplary embodiment, since the gap S is applied with lyophilicity during the process of curing UV-curing resin by exposing to the UV light. Any separate process to apply lyophilicity can be omitted, which can contribute to simplifying the manufacturing process. In addition to this, in the present exemplary embodiment, since the UV-curing resin and the light-blocking ink are applied by droplet ejection, the microlens array can easily be formed.

Further, since the present exemplary embodiment includes the process of applying lyophobicity to the lens sections L while maintaining lyophilicity of the gap S, any of the ejected droplets of the light-blocking ink applied on the lens sections L are repelled by the lens sections L to be pooled on the gap S between the lens sections L. Thus, it can effectively be avoided that the light-blocking material contained in the light-blocking ink remains on the lens sections L that must be translucent, which can reduce or prevent the quality of the product as a microlens array from being degraded.

Second Exemplary Embodiment

The first exemplary embodiment described above has a configuration of blocking the light entering the gap S between the lens sections L. However, it is also effective to reduce the view angle dependency to use a material that does not block the whole light but transmits a part of the light. Other than the configuration of blocking at least a part of the light, it is also possible to adopt a configuration in which the incident light is emitted after being scattered by a scattering material contained in the ink. Thereby the rectilinear propagation of the incident light is controlled. In this case, although almost the whole light passing through the gap S is output, it is still possible to contribute to broadening the view angle because the output light is scattered.

As a configuration of scattering light, it is also possible to use the same UV-curing resin as the lens sections L instead of using the ink containing the scattering material.

Figure 4A:
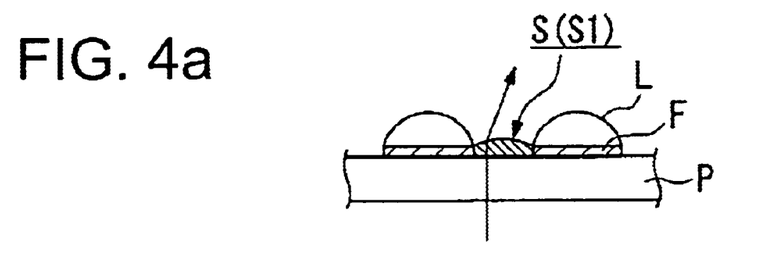
FIGS. 4a and 4b are schematics showing an alternative manufacturing method.
Figure 4B:
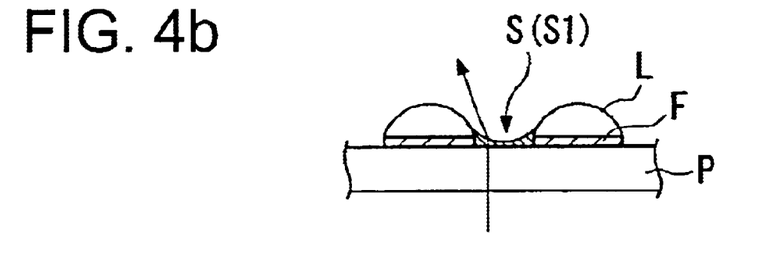

Specifically, by adjusting the contact angle of the surface of the substrate in the gap S or a baking condition of the UV-curing resin ejected to the gap S, as shown in FIG. 4a, the UV-curing resin ejected to the gap S can be shaped as a convex shape with the surface arching upward or a concave shape with a center portion of the gap S arching downward. In this case, the light entering the gap S is refracted when it is output, thus being prevented from going straight. Accordingly, it is possible to reduce the view angle dependency caused by the rectilinear propagation of light thus contributing to enhancement of the contrast.

Third Exemplary Embodiment

Figure 5:
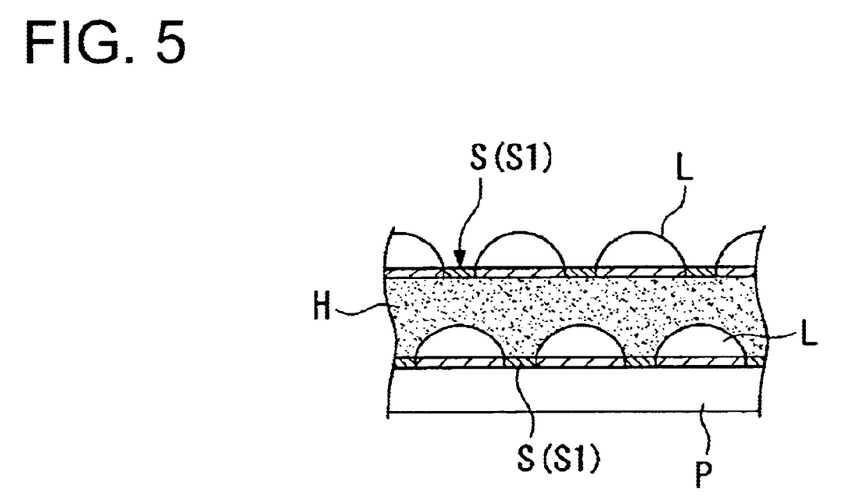
FIG. 5 is schematic showing a microlens having a double layer structure.

FIG. 5 shows a cross-sectional schematic of the microlens having a double layer structure.

As shown in this figure, by similar processes to the first exemplary embodiment described above, the lens sections L and the light-blocking section S1 defined between the lens sections L are first formed on the substrate P as a first layer. Then a covering layer H for covering the above is formed. Taking the above process to apply lyophilicity (the UV-curing process) and translucency into consideration, ceramics materials, such as silicon nitride ($Si_3N_4$) or silicon oxide ($SiO_2$) can be used as the covering layer H.

Then, a second layer of the microlens array is formed on the covering layer H that functions as a substrate in the same manner as the first layer. In this case, the microlens arrays are arranged so that the lens sections L of one layer are shifted from those of the other layer. Preferably, as shown in the drawing, they are arranged so that the pitch of the lens sections L of the first layer is shifted from the pitch of the lens sections L of the second layer as much as a half the pitch ($\pi/2$).

Note that in the present exemplary embodiment, not only a light-blocking structure but also a scattering structure described above can be formed in the gap between the lens sections L.

As described above, when forming the microlens array having the lens sections L and the light-blocking section S1 in a plurality of layers, by shifting the positions of the lens sections L of one layer from those of the other layer, the light passing through the gap S of the first layer and entering the gap between the lens sections of the second layer can be blocked by the second layer with high probability. Furthermore, if the light is not blocked but scattered, since the light passing straight through the first layer is output from a different position of the second layer from that of the first layer, a chance for the light to be output straight from the second layer can significantly be reduced. Thus, the present exemplary embodiment can also reduce the view angle dependency caused by the rectilinear propagation of light and thus contributing to enhancement of the contrast.

Fourth Exemplary Embodiment

As a fourth exemplary embodiment, a liquid crystal display device that is an example of an electro-optic device according to the present invention is hereinafter described.

Figure 6:
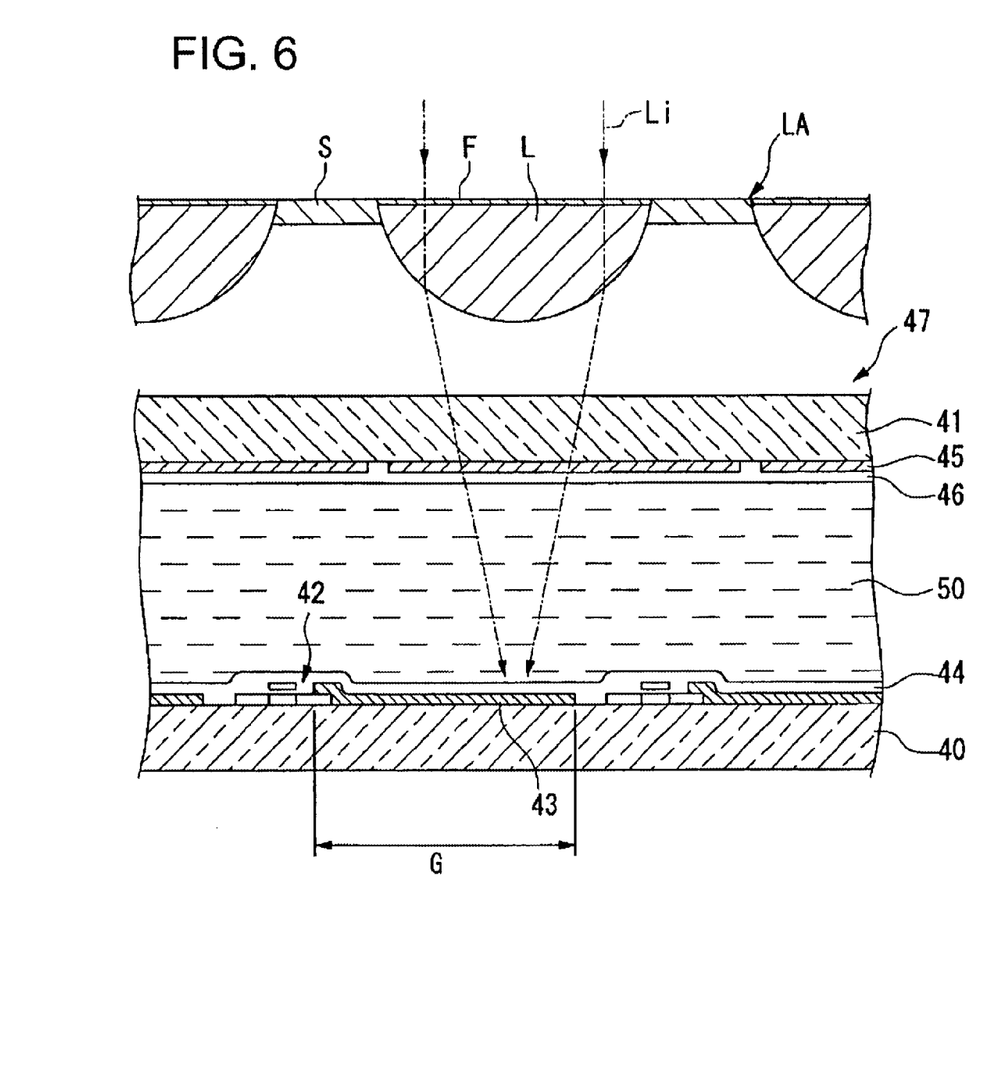
FIG. 6 is a cross-sectional schematic showing a cross-sectional structure of the liquid crystal display device.

FIG. 6 shows a cross-sectional schematic of the liquid crystal display device.

In the liquid crystal display device shown in this figure, there are disposed a TFT array substrate 40 and an opposing substrate 41 facing to each other. A liquid crystal layer 50 including liquid crystal is sandwiched between the substrates 40 and 41. The TFT array substrate 40 is made of a translucent material, such as quartz or glass and is provided with a TFT 42 formed on the inner surface (the surface contacting to the liquid crystal layer) thereof, the TFT 42 being connected to a pixel electrode 43. Further, an alignment film 44 is formed on the front most face of the TFT array substrate 40.

The opposing substrate 41 is made of a translucent material, such as quartz or glass and is provided with a common electrode 45 formed on the inner surface (the surface contacting to the liquid crystal layer 50) thereof, the common electrode 45 being made of a transparent conductive film, such as ITO. Furthermore, an alignment film 46 is also formed on the front most face of the opposing substrate 41 as is the case with the TFT array substrate 40.

Further, in the outer surface (the opposite surface to the surface contacting to the liquid crystal layer 50) side, the microlens array (the microlens device) LA, as a collection device, manufactured by the manufacturing method described above, is disposed away from the opposing substrate 41 for a predetermined distance. The microlens array LA includes a plurality of microlenses disposed in a matrix.

The microlens array may be aligned to the optimum position and then fixed relative to liquid crystal cells 47 by an appropriate fixing device. Incident light Li passes through the microlens array LA, the opposing substrate 41, the liquid crystal layer 50, and the TFT array substrate 40 in this order in the present configuration. The incident light Li to the microlens array is condensed to a pixel region with a predetermined spot diameter.

In the present exemplary embodiment, since the microlens array is manufactured by the manufacturing method described above, the incident light Li entering the lens sections L is condensed to the corresponding liquid crystal cells 47 while the light entering the gap between the lens sections L is blocked (or scattered) in the gap S, thus preventing expansion of the view angle dependency due to the light passing straight and providing the liquid crystal display device having enhanced contrast.

Fifth Exemplary Embodiment

Figure 7:
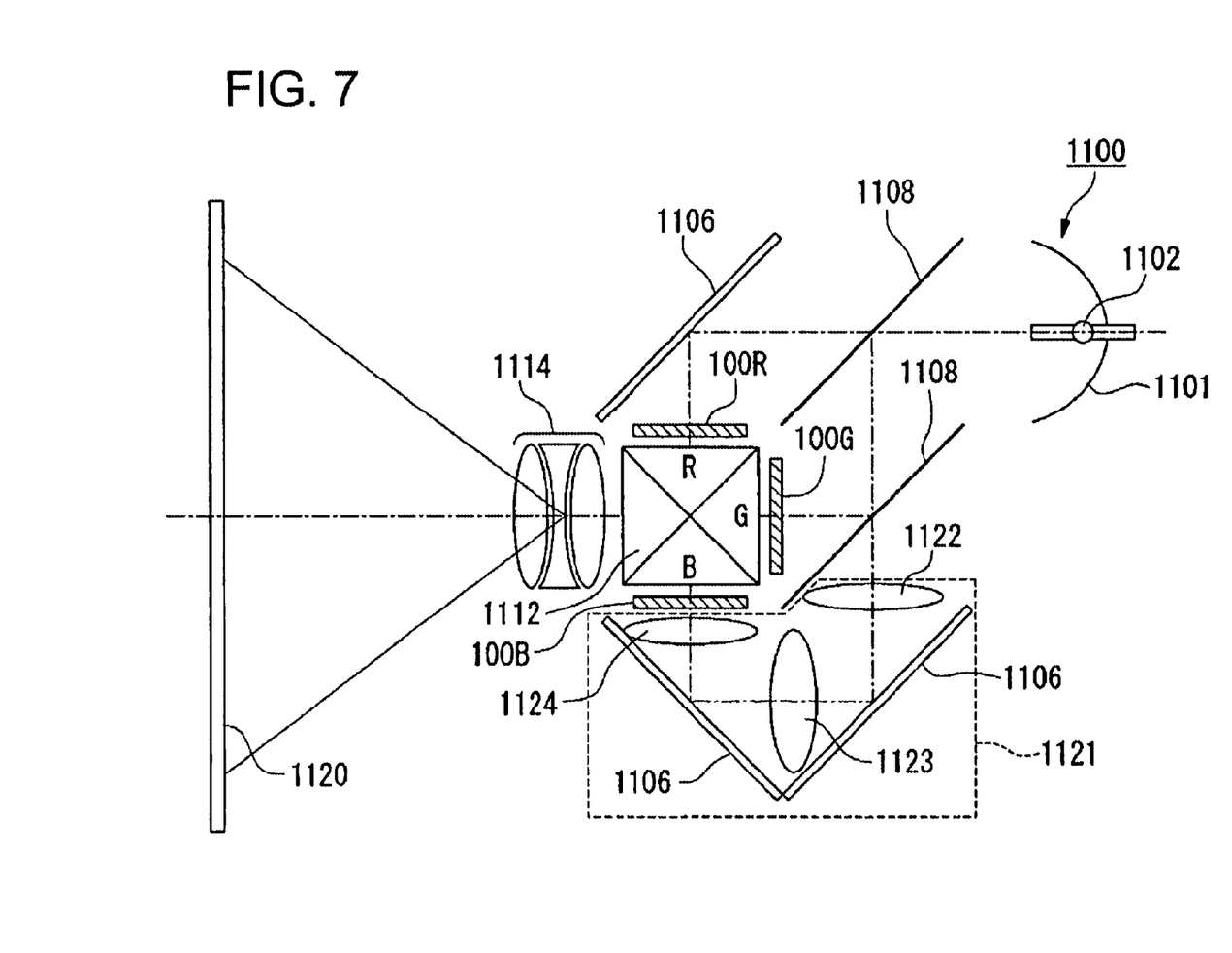
FIG. 7 is a schematic showing one example of a projection type of liquid crystal display device.

FIG. 7 shows a schematic of one example of a so-called three panel projection type of liquid crystal display device (a liquid crystal projector) using three liquid crystal display devices described above as the fourth exemplary embodiment as an optical modulation device (a light bulb). In the figure, the reference numeral 1100 denotes a light source, 1108 denotes a dichroic mirror, 1106 denotes a mirror reflector, 1122, 1123, and 1124 denote relay lenses, 100R, 100G, and 100B denote liquid crystal light bulbs, 1112 denotes a cross-dichroic prism, 1114 denotes a projection lens system.

The light source 1100 is composed of a lamp 1120, such as a metal halide lamp and a reflector 1101 to reflect light from the lamp 1102. A blue-light/green-light reflecting dichroic mirror 1108 transmits red light out of white light emitted from the light source 1100 and reflects blue light and green light. The transmitted red light is reflected by the mirror reflector and enters the liquid crystal light bulb 100R for red light.

Out of the light reflected by the dichroic mirror 1108, the green light is reflected by a green-light reflecting dichroic mirror 1108 and enters the liquid crystal light bulb 100G for green light. The blue light is also transmitted by the second dichroic mirror 1108. A light guide device 1121 including a relay lens system including an entrance lens 1122, a relay lens 1123, and an exit lens 1124 is provided for the blue light in order to compensate difference in the optical path length with the green or red light, and the blue light enters the liquid crystal light bulb 100B for blue light via the light guide 1121. Although omitted in the drawings, in the entrance side of each of the liquid crystal light bulbs 100R, 100G, and 100B for light of respective colors, there is provided the microlens array in the liquid crystal display device according to the above exemplary embodiment.

The three colored light beams modulated by the respective light bulbs enter cross-dichroic prism 1112. The prism is formed of four rectangular prisms bonded with each other. A dielectric multilayer film to reflect red light and a multilayer film to reflect blue light are formed crosswise on the inside surface thereof. The three colored light beams are combined by these dielectric multilayer films into the light to display color images. The combined light is projected on a screen 1120 by a projection lens system 1114, thus displaying an enlarged image.

Figure 8:
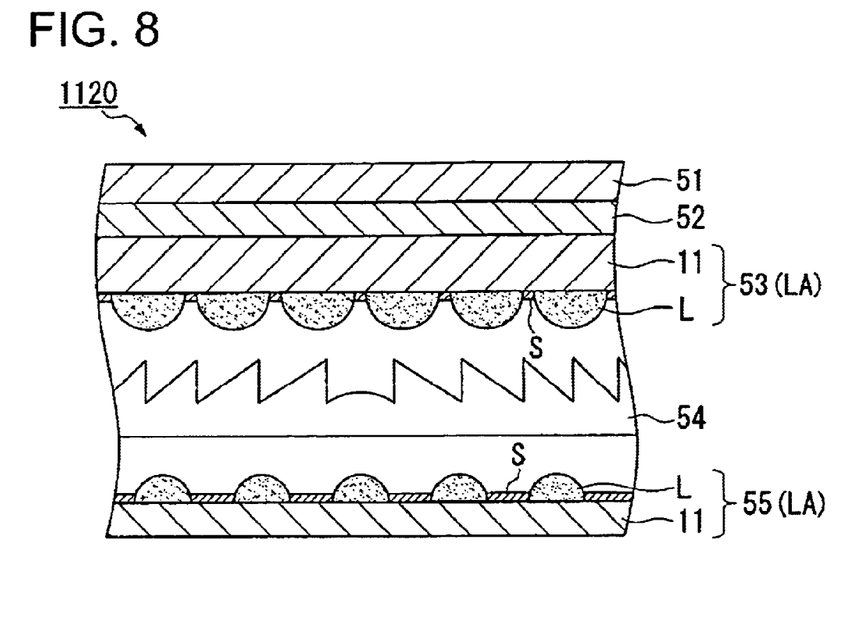
FIG. 8 is a schematic for showing one example of a projector screen.

FIG. 8 shows one example of a projector screen equipped with the microlens array described above. In FIG. 8, the reference numeral 1120 denotes a projector screen (hereinafter "screen"). This screen 1120 is formed by adhering a lenticular sheet 53 on a film base 51 via adhesive layer 52 and then disposing on the lenticular sheet 53 a Fresnel lens 54 and a scattering film 55 in this order.

The lenticular sheet 53 is formed by disposing a number of microlenses (lens sections) L on a translucent sheet (a base) 11 and disposing the light-blocking section S1 between the lenses. Further, the scattering film 55 is formed by disposing microlenses (lens sections) on the translucent sheet 11 with lower density than in the case of the lenticular sheet 53.

Note that as the translucent sheet 11, cellulosic resin, such as acetylcellulose or propyl cellulose, or transparent resin (translucent resin), such as polyvinylchloride, polyethylene, polypropylene, or polyester as described above can be used.

The screen 1120 offers a good scattering performance to provide enhanced contrast, because the microlens array LA is used as the lenticular sheet 53 and the scattering film 55. According to this, the quality of the image projected on the screen 1120 can be enhanced, and the visibility of the image projected on the screen 1120 can also be enhanced.

Furthermore, since the liquid crystal display device according to the exemplary embodiment described above is used in the projection type of liquid crystal display device configured as above, it can be possible to realize a projection type of liquid crystal display device with enhanced contrast and good display quality.

Note that both of a front type and a rear type are applicable as the projection type of liquid crystal display device.

Sixth Exemplary Embodiment

Figure 9:
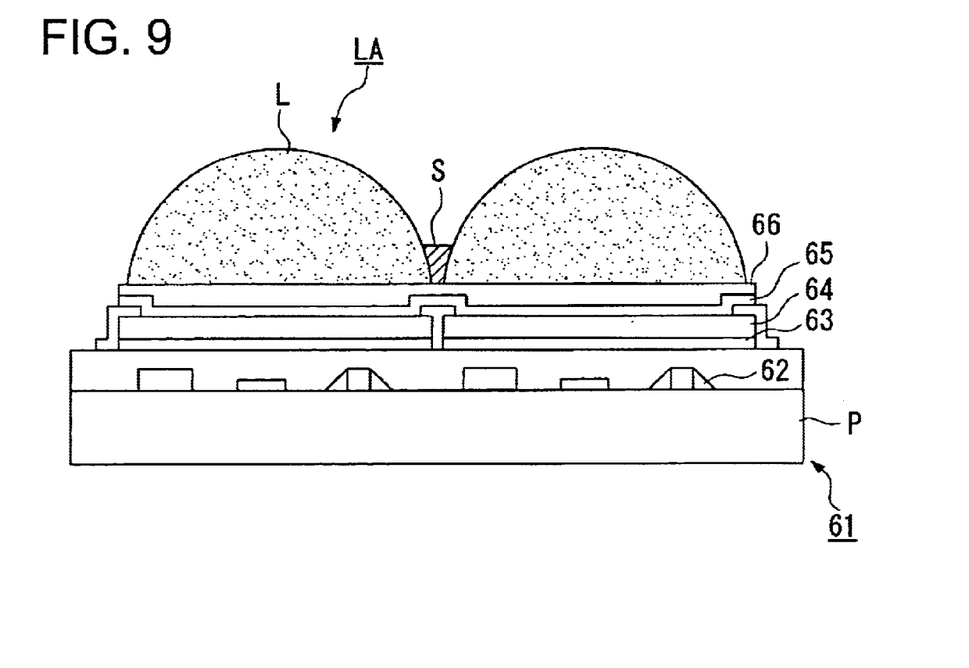
FIG. 9 is a cross-sectional schematic for showing an organic EL device.

FIG. 9 is a schematic showing an organic electroluminescence device (an organic EL device) equipped with a microlens device according to an aspect of the present invention.

The present organic EL device (an electro-optic device) 61 includes a substrate P, an cathode 63 disposed on the substrate P, an organic EL film (a light emitting layer) 64 disposed on the cathode 63, and a transparent anode (ITO) 65 disposed on the organic EL film 64. The cathode 63, the organic EL film 64, and the anode 65 form an organic EL light-emitting element.

A plurality of the cathodes 63 and a plurality of the organic EL films 64 are provided on the substrate P, each pair forming a pixel. Further, a transistor 62 to actively drive the organic EL element is provided on the substrate P. A protective film (a passivation layer) 66 made of an inorganic material, such as $SiO_2$, is formed on the anode 65.

In addition, the present organic EL device 61 is provided with the microlens array LA having the lens sections L and the light-blocking section S1, the microlens array LA being manufactured by the method described above and disposed on the protective film 66 namely above the anode (an electrode on the light emitting side) 65 of the organic EL element. In this case, the protective film 66 intervenes between the anode 65 and the microlens array LA, which prevents the anode 65 from oxidizing. Each of the lens sections L of the microlens array LA is disposed on every pixel (a pair of the cathode 63 and the organic EL film 64) of the organic EL element. The arrangement of the each of the lens sections L of the microlens array LA and the pixel of the organic EL element is not limited to what shown in FIG. 9. The arrangement can be available in which one pixel of the organic EL element is disposed corresponding to every a plurality of the lens sections L of the microlens array LA. The arrangement can also available in which a plurality of pixels of the organic EL elements are disposed corresponding to every one of the lens sections L of the microlens array LA.

By the configurations described above, the light emitted by the organic EL film 64 passes through the transparent anode 65, and then passes through the transparent protective film 66, and then passes through the lens section L of the microlens array LA, and finally comes out of the organic EL device 61.

Here, if a portion of the light emitted from the organic EL film 64 is emitted at an angle to the surface of the substrate P, the portion of the light is refracted by the lens section L of the microlens array LA to be perpendicular to the surface of the substrate P and then output to outside of the device. Accordingly, almost all light (e.g., more than 95%) emitted from the organic EL film 64 can be output to outside the organic EL device 61 to reach naked eyes.

Furthermore, the light emitted from the organic EL film 64 and entering the light-blocking section S1 is blocked here, and accordingly, is not output to outside the organic EL device 61. Therefore, it is avoided that the view angle dependency is enlarged by the light output straight, and the output light can be used effectively with the enhanced contrast.

Seventh Exemplary Embodiment

As the seventh exemplary embodiment, actual examples of an electronic apparatus according to aspects of the present invention are hereinafter described.

Figure 10A:
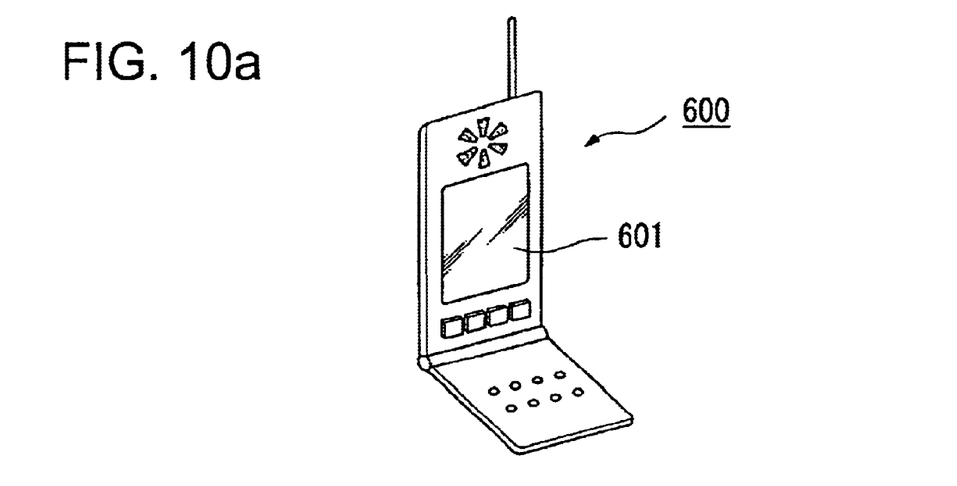
FIGS. 10a–10c are schematics showing actual examples of an electronic apparatus according to an aspect of the present invention.

FIG. 10*a* is a schematic showing one example of a mobile phone. In FIG. 10*a*, the reference numeral 600 denotes a main body of the mobile phone, and 601 denotes a liquid crystal display section equipped with the liquid crystal display device according to the fourth embodiment described above.

Figure 10B:
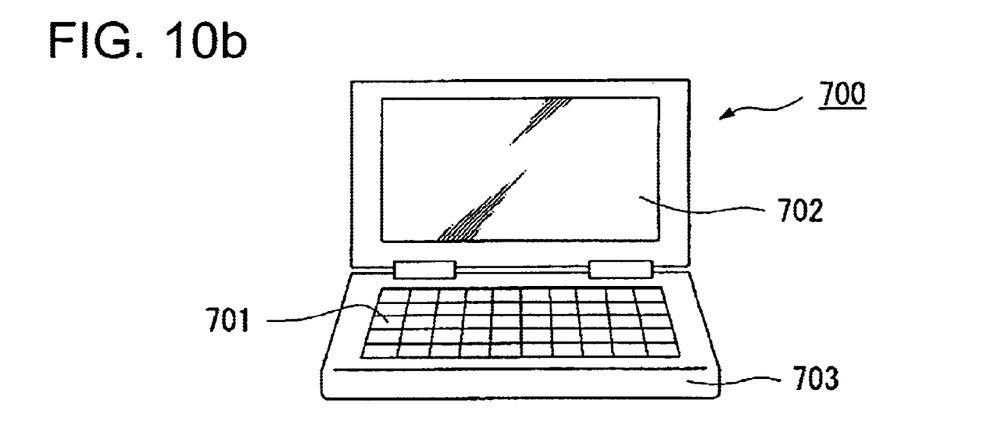

FIG. 10*b* is a schematic showing one example of a portable information processing device, such as a word processor or a personal computer. In FIG. 10*b*, the reference numeral 700 denotes an information processing device, 701 denotes an input section, such as a keyboard, 703 denotes a main body of the information processing device, and 702 denotes a liquid crystal display section equipped with the liquid crystal display device according to the fourth exemplary embodiment described above.

Figure 10C:
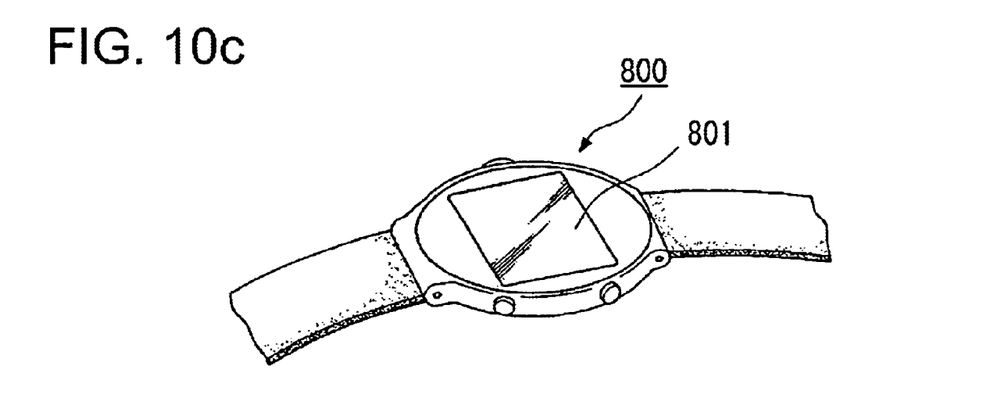

FIG. 10*c* is a schematic showing one example of a wristwatch electronic apparatus. In FIG. 10*c*, the reference numeral 800 denotes a main body of the wristwatch, and 801 denotes a liquid crystal display section equipped with the liquid crystal display device according to the fourth exemplary embodiment described above. Note that in case of mounting the liquid crystal display device described above on this type of electronic apparatus, the configuration can be adopted in which the microlens array is positioned between a backlight as the light source for the liquid crystal display device and liquid crystal cells.

The electronic apparatuses shown in FIGS. 10*a* through 10*c* are equipped with the liquid crystal display device according to the fourth exemplary embodiment, and accordingly realize electronic apparatus equipped with high contrast liquid crystal display sections.

Although the electronic apparatus according to the present exemplary embodiments are equipped with liquid crystal display devices, electronic apparatus equipped with other electro-optic devices, such as an organic EL device, can also be provided.

Although the exemplary embodiments according to the present invention are described referring to the accompanying drawings, it is obvious that the present invention is not limited to such exemplary embodiments. The shapes or the combinations of the components described in the above exemplary embodiments are examples only, and therefore can be modified in various manners in accordance with, for example, necessities in design within a scope and/or spirit of the present invention.

For instance, in the exemplary embodiments described above, the configuration is adopted in which the ink containing the light-blocking material or light-scattering material is applied to the gap S between the lens sections L by the droplet ejection method. However, the present invention is not limited to such a configuration but includes a configuration in which the ink is applied by, for example, a spin coat method, dipping method, or cast method.

What is claimed is:

1. A method of manufacturing a microlens device, comprising:

ejecting a droplet to form a plurality of lens sections on a substrate with a predetermined gap therebetween; and applying a control material in the gap between the lens sections, the control material controlling rectilinear propagation of light.

2. The method of manufacturing a microlens device according to claim 1, further comprising:

curing the lens sections formed on the substrate and providing lyophilicity to a region corresponding to the gap before applying the control material.

3. The method of manufacturing a microlens device according to claim 2, further comprising:

providing lyophobicity to the cured lens sections while keeping lyophilicity of the region corresponding to the gap.

4. The method of manufacturing a microlens device according to claim 1, comprising:

forming a plurality of layers of the lens sections and the control material applied between the lens sections with the lens sections in one layer shifted from the lens sections in an other layer.

5. The method of manufacturing a microlens device according to claim 1, comprising:

ejecting a droplet containing the control material to apply the control material to the gap.

6. The method of manufacturing a microlens device according to claim 1, the control material absorbing at least a part of the light.

7. The method of manufacturing a microlens device according to claim 1, the control material reflecting the light.

8. The method of manufacturing a microlens device according to claim 1, the control material scattering the light.

9. The method of manufacturing a microlens device according to claim 8, comprising:

forming the control material in the gap with the surface curved.

10. A microlens device manufactured by the method according to claim 1.

11. An electro-optic device, comprising:

the microlens device according to claim 10.

12. The electro-optic device according to claim 11, further comprising:

an organic electroluminescent element including a light emitting layer between electrodes, the microlens device being disposed above one of the electrodes disposed on a light emission side of the light emitting layer.

13. An electronic apparatus, comprising:

the electro-optic device according to claim 11.

* * * * *